(12) United States Patent
Bae (10) Patent No.: US 11,449,390 B2
(45) Date of Patent: Sep. 20, 2022

(54) IMAGE FORMING APPARATUS FOR BACKING UP APPLICATIONS, AND OPERATION METHOD THEREFOR

(71) Applicant: Hewlett-Packard Development Company, L.P., Spring, TX (US)

(72) Inventor: Jung-Nam Bae, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 280 days.

(21) Appl. No.: 16/460,122

(22) Filed: Jul. 2, 2019

(65) Prior Publication Data

US 2019/0324863 A1 Oct. 24, 2019

Related U.S. Application Data

(63) Continuation of application No. PCT/KR2017/007014, filed on Jul. 3, 2017.

(30) Foreign Application Priority Data

Jan. 4, 2017 (KR) .................. 10-2017-0001316

(51) Int. Cl.
*G06F 11/14* (2006.01)
*G06F 8/61* (2018.01)

(52) U.S. Cl.
CPC ............ *G06F 11/1451* (2013.01); *G06F 8/61* (2013.01); *G06F 11/1464* (2013.01); *G06F 2201/84* (2013.01)

(58) Field of Classification Search
CPC ... G06F 11/14; G06F 11/1464; G06F 11/1451
See application file for complete search history.

(56) References Cited

U.S. PATENT DOCUMENTS

| | | | | |
|---|---|---|---|---|
| 6,493,871 | B1 * | 12/2002 | McGuire | G06F 8/65 717/169 |
| 6,751,795 | B1 * | 6/2004 | Nakamura | G06F 8/658 717/174 |
| 2004/0221024 | A1 * | 11/2004 | Yamada | H04L 67/34 709/222 |

(Continued)

FOREIGN PATENT DOCUMENTS

| | | |
|---|---|---|
| CN | 1892600 A | 1/2007 |
| CN | 102117234 A | 7/2011 |

(Continued)

*Primary Examiner* — Kamini B Patel
(74) *Attorney, Agent, or Firm* — Jefferson IP Law, LLP (57) ABSTRACT

An image forming apparatus which obtains an installation file of an application from the outside when the installation file is not obtainable from the image forming apparatus during backup, and an operating method of the image forming apparatus, are provided. The image forming apparatus includes a memory, a communication interface, and at least one processor. The at least one processor determines whether an installation file of an application to be backed up is obtainable from the memory, obtains, when the installation file of the application to be backed up is not obtainable from the memory, the installation file of the application to be backed up from an external storage device or a server via the communication interface, and generates a backup file based on the obtained installation file.

18 Claims, 10 Drawing Sheets

(56) References Cited

U.S. PATENT DOCUMENTS

| | | | |
|---|---|---|---|
| 2004/0255263 A1 | 12/2004 | Ando | |
| 2006/0274669 A1* | 12/2006 | Falck | H04W 64/00 370/254 |
| 2007/0096933 A1* | 5/2007 | Enitan | G08B 13/1427 340/686.6 |
| 2009/0150454 A1* | 6/2009 | Gejdos | G16H 10/60 |
| 2011/0047128 A1* | 2/2011 | Brunet | G07F 17/0014 707/654 |
| 2014/0032915 A1* | 1/2014 | Muzammil | H04L 9/3247 713/176 |
| 2014/0297802 A1* | 10/2014 | Liang | G08B 27/006 709/217 |
| 2015/0099502 A1 | 4/2015 | Park et al. | |
| 2015/0331648 A1 | 11/2015 | Tomomatsu et al. | |
| 2015/0359489 A1* | 12/2015 | Baudenbacher | G16H 40/67 600/300 |
| 2016/0274918 A1* | 9/2016 | Moon | G06F 9/4406 |
| 2017/0293886 A1* | 10/2017 | Bostick | G06Q 10/08355 |
| 2018/0183653 A1* | 6/2018 | Chew | H04L 69/22 |

FOREIGN PATENT DOCUMENTS

| | | |
|---|---|---|
| CN | 102238305 A | 11/2011 |
| CN | 102662801 A | 9/2012 |
| CN | 103679029 A | 3/2014 |
| CN | 105912419 A | 8/2016 |

\* cited by examiner

IMAGE FORMING APPARATUS FOR BACKING UP APPLICATIONS, AND OPERATION METHOD THEREFOR

BACKGROUND

While using a personal electronic device such as a multifunction printer, a user can install an application that provides a function desired by the user. However, when the personal electronic device is out of order or a new electronic device is purchased, the personal electronic device may be replaced. In this case, it may be convenient when applications that have been installed on the electronic device before replacement and application-related setting values are restored to the replacement electronic device. To meet these demands, a function of backing up installation files of applications used in a previous electronic device and application-related setting values and restoring them to a new electronic device may be provided.

However, when an installation file of an application does not exist in a previous electronic device, there is the inconvenience of having to perform a backup without the installation file of the application and additionally obtaining the installation file of the application separately during restoration.

DESCRIPTION OF EXAMPLES

Hereinafter, various examples will be described with reference to the attached drawings. The examples described below may also be embodied in various modified forms. Throughout the specification, a repeated description with respect to that which has already been described will be omitted for the sake of brevity.

When a part may "include" a certain constituent element, unless otherwise defined, other elements are not excluded from the part and the part may further include other elements.

As used herein, the term "image forming job" may indicate various jobs related to an image (e.g., printing, copying, scanning or faxing), such as forming an image or creating, storing, or transmission of an image file, and the term "job" may refer to not only an image forming job but also a series of processes necessary for performing an image forming job.

In addition, the term "image forming apparatus" refers to any apparatus capable of performing an image forming job, such as a printer, a copier, a scanner, a fax machine, a multi-function printer (MFP) or a display apparatus.

Also, the term "content" may refer to any type of data subject to an image forming job such as a photograph, an image, a document file, or the like.

In addition, "user" may refer to a person who performs an operation related to an image forming job by using an image forming apparatus or a device connected with an image forming apparatus in a wired or wireless manner. The term "administrator" may refer to a person who has authority to access all the functions and systems of an image forming apparatus. The "administrator" and the "user" may be the same person.

Hereinafter, various examples will be described with reference to the attached drawings.

Figure 1:
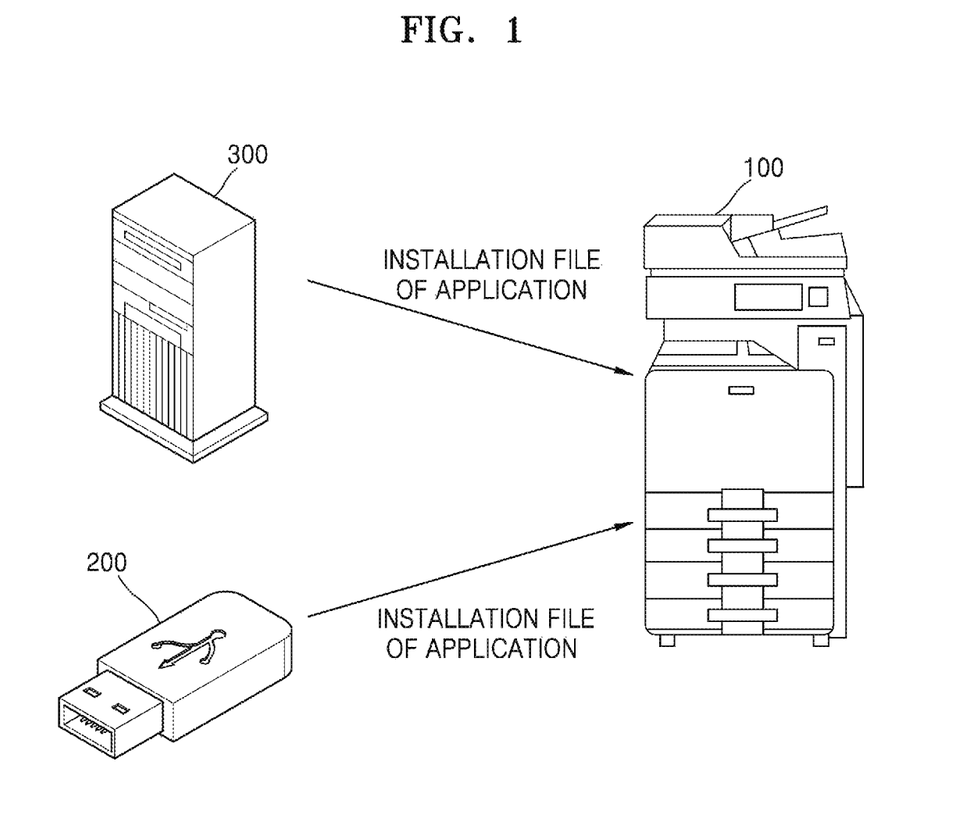
FIG. 1 illustrates an operation of obtaining an installation file of an application from an external storage device or a server when an image forming apparatus performs a backup according to an example.

FIG. 1 illustrates an operation of obtaining an installation file of an application from an external storage device or a server when an image forming apparatus performs backup according to an example.

Referring to FIG. 1, when an installation file of an application to be backed up by the image forming apparatus 100 is not available in the image forming apparatus 100, the image forming apparatus 100 may obtain the installation file of the application to be backed up from an external storage device 200 or a server 300.

The external storage device 200 may include, for example, a storage medium such as a universal serial bus (USB), a compact disc (CD), an external hard disk, or the like. The external storage device 200 may also include an electronic device such as an image forming apparatus, a smartphone, a tablet, a personal computer (PC), a household appliance, a medical device, a camera, a wearable device, or the like, and an object included in the external storage device 200 is not limited thereto.

When the image forming apparatus 100 performs a backup and an installation file of an application to be backed up is not obtained, it may be inconvenient to obtain the installation file of the application when restoring the application from another electronic device. When an electronic device that is to perform restoration is operated via multiple platforms, each installation file that is compatible with each of the platforms is to be obtained when restoring the application, which may be even more burdensome for a user.

According to the example illustrated in FIG. 1, when an installation file of an application to be backed up is not present in the image forming apparatus 100 when the image forming apparatus 100 performs backup, the image forming apparatus 100 attempts to obtain the installation file of the application from the external storage device 200 or the server 300, and thus, a rate of obtaining an installation file of an application by the image forming apparatus 100 during backup of the application may be increased.

Figure 2:
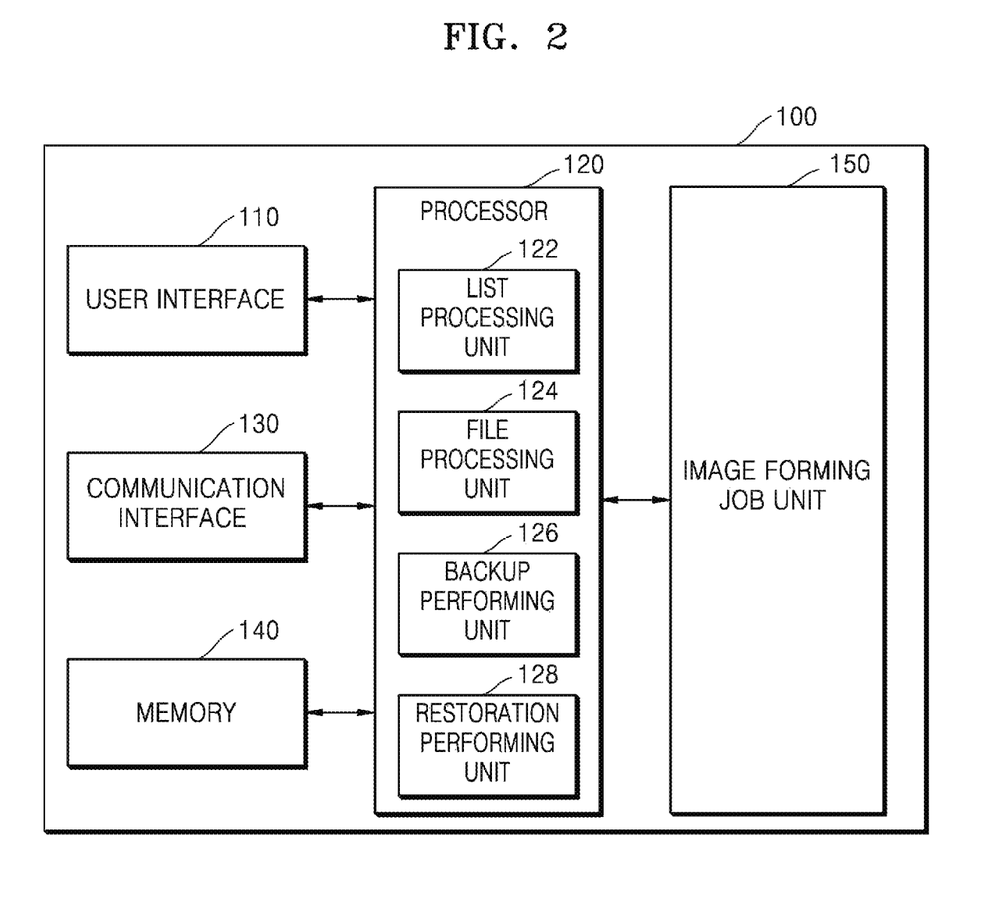
FIG. 2 is a block diagram illustrating a configuration of an image forming apparatus according to an example.

FIG. 2 is a block diagram illustrating a configuration of an image forming apparatus according to an example.

Referring to FIG. 2, the image forming apparatus 100 may include a user interface 110, a processor 120, a communication interface 130, a memory 140, and an image forming job unit 150. In addition, although not illustrated, the image forming apparatus 100 may further include a power supply unit to supply power to each of the components.

The user interface 110 may include an input unit via which an input for executing an image forming job is received from a user, and an output unit to display information such as a result of an image forming job or a status of the image forming apparatus 100. For example, the user interface 110 may include an operation panel via which a user input is received and a display panel to display a screen.

As an example, an input unit may include a device to receive a user input in various forms, such as a keyboard, a physical button, a touch screen, a camera a microphone, or the like. In addition, an output unit may include, for example, a display panel, a speaker, or the like. However, the user interface 110 is not limited thereto, and may include other devices supporting various input and output.

The processor 120 may control an operation of the image forming apparatus 100 and may include a processor such as a central processing unit (CPU). The processor 120 may control other components included in the image forming apparatus 100 such that an operation corresponding to a user input received via the user interface 110 is performed.

For example, the processor 120 may execute a program stored in the memory 140, read a file stored in the memory 140, or store a new file in the memory 140.

In the example of FIG. 2, the processor 120 is illustrated as including a list processing unit 122, a file processing unit 124, a backup performing unit 126, and a restoration performing unit 128. In other examples, the processor 120 may include only some of the components or may further include components for other types of control.

The list processing unit 122 may manage a list of applications installed on the image forming apparatus 100. In order for the image forming apparatus 100 to receive, from a user, an input for selecting an application to be backed up, the list processing unit 122 may provide the user interface 110 with the list of applications installed on the image forming apparatus 100.

The file processing unit 124 may receive an installation file of an application that is to be backed-up. In an example, the installation file may be obtained from the external storage device 200 or the server 300 via the communication interface 130. In addition, the file processing unit 124 may transmit an installation file of an application to be backed up to the memory 140.

The backup performing unit 126 may generate a backup file of an application based on a backup command received from a user via the user interface 110. As an example, the backup performing unit 126 may generate a backup file of an application based on an installation file of the application and data about a setting value of the application.

A "setting value of an application" may refer to a value set in connection with a function of each application. Each function of an application may be differently performed based on a setting value of the application. For example, when a scan image quality is set to 300 dpi in a scan application, a scan file of a higher image quality may be obtained than with a scan image quality set to 150 dpi.

In response to a restoration command regarding an application received via the user interface 110, the restoration performing unit 128 may install the application in the image forming apparatus 100 by using a backup file generated using the backup performing unit 126.

Alternatively, when restoration is attempted based on a backup file backed up using an external image forming apparatus (not shown), in response to an application restoration command received via the user interface 110, the restoration performing unit 128 of the image forming apparatus 100 may obtain a backup file generated by the external image forming apparatus, and may install an application in the image forming apparatus 100 by using the obtained backup file.

When an installation file of the application is included in the backup file, the restoration performing unit 128 may install the application immediately. However, when the installation file of the application is not included in the backup file, the installation file of the application is to be obtained.

In response to a request for application restoration from an external image forming apparatus (not shown) received via the communication interface 130, the restoration performing unit 128 may transmit a backup file, generated using the backup performing unit 126, to an external device.

The communication interface 130 may perform wired or wireless communication with another device or a network. To this end, the communication interface 130 may include a communication module (e.g., transceiver) supporting at least one of various wired or wireless communication methods. For example, the communication module may be in the form of a chipset, or may be a sticker/barcode (e.g., a sticker containing a near field communication (NFC) tag) or the like that contains information necessary for communication.

Examples of wireless communication may include at least one of Wireless Fidelity (Wi-Fi), Wi-Fi Direct, Bluetooth, ultra-wide band (UWB), NFC, or the like. Examples of wired communication may include at least one of USB, high definition multimedia interface (HDMI), or the like. In addition, the communication interface 130 may perform wired or wireless communication with another device or network via simple network management protocol (SNMP), hyper text transfer protocol (HTTP), or the like.

The communication interface 130 may be connected to an external device located outside the image forming apparatus 100 and may transmit and receive signals or data. In an example, the image forming apparatus 100 may be connected to the external storage device 200 via the communication interface 130. The communication interface 130 may transmit signals or data received from the external storage device 200 to the processor 120 or may transmit signals or data generated in the processor 120 to the external storage device 200. For example, when the communication interface 130 receives a print command signal and print data from the external storage device 200, the processor 120 may output the received print data by using the image forming job unit 150.

In the memory 140, programs such as applications and various types of data such as files may be installed and stored. The processor 120 may access data stored in the memory 140 and use the data or may store new data in the memory 140. In addition, the processor 120 may execute a program installed in the memory 140 and may install, in the memory 140, an application received from an external source via the communication interface 130.

The image forming job unit 150 may perform an image forming job such as printing, copying, scanning, or faxing.

Figure 3:
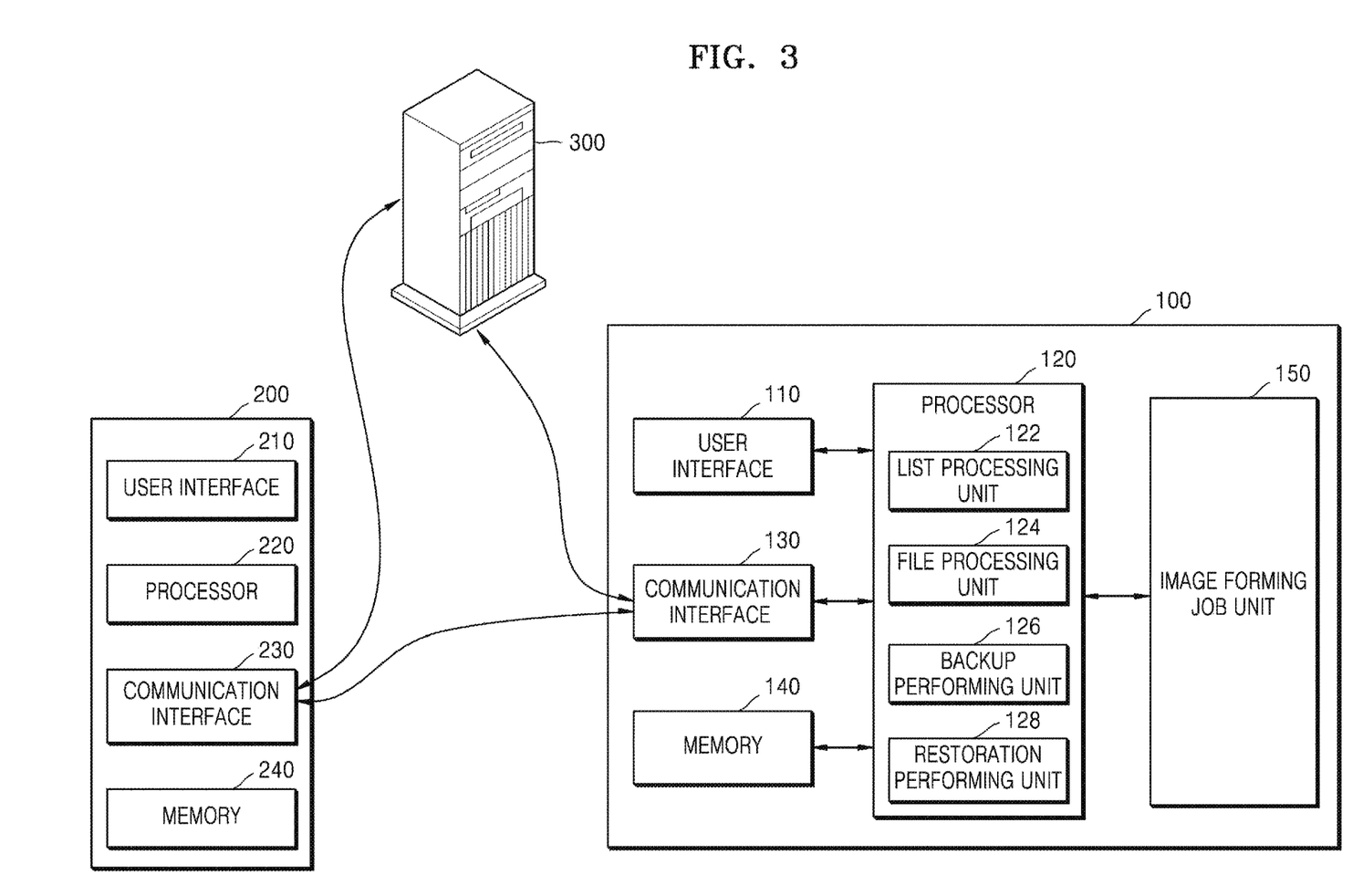
FIG. 3 is a block diagram illustrating a relationship between an image forming apparatus, an external storage device, and a server according to an example.

FIG. 3 is a block diagram illustrating a relationship between an image forming apparatus, an external storage device, and a server according to an example.

Referring to FIG. 3, the external storage device 200 may include a user interface 210, a processor 220, a communication interface 230, and a memory 240. The processor 220 may execute a program stored in the memory 240. The processor 220 may transmit a signal or data obtained as a result of the execution to the image forming apparatus 100 via the communication interface 230 to control an image forming job.

The communication interface 130 may be connected to the server 300 to transmit or receive signals or data. In addition, the communication interface 130 may be connected to the external storage device 200 via the server 300. That is, the communication interface 130 of the image forming apparatus 100 may transmit or receive a signal or data to or from the communication interface 230 of the external storage device 200 via the server 300.

For example, the communication interface 130 may be connected to the communication interface 230 of the external storage device 200 or the server 300 to obtain an installation file of an application or may obtain an installation file of an application from the communication interface 230 of the external storage device 200 via the server 300.

Figure 4:
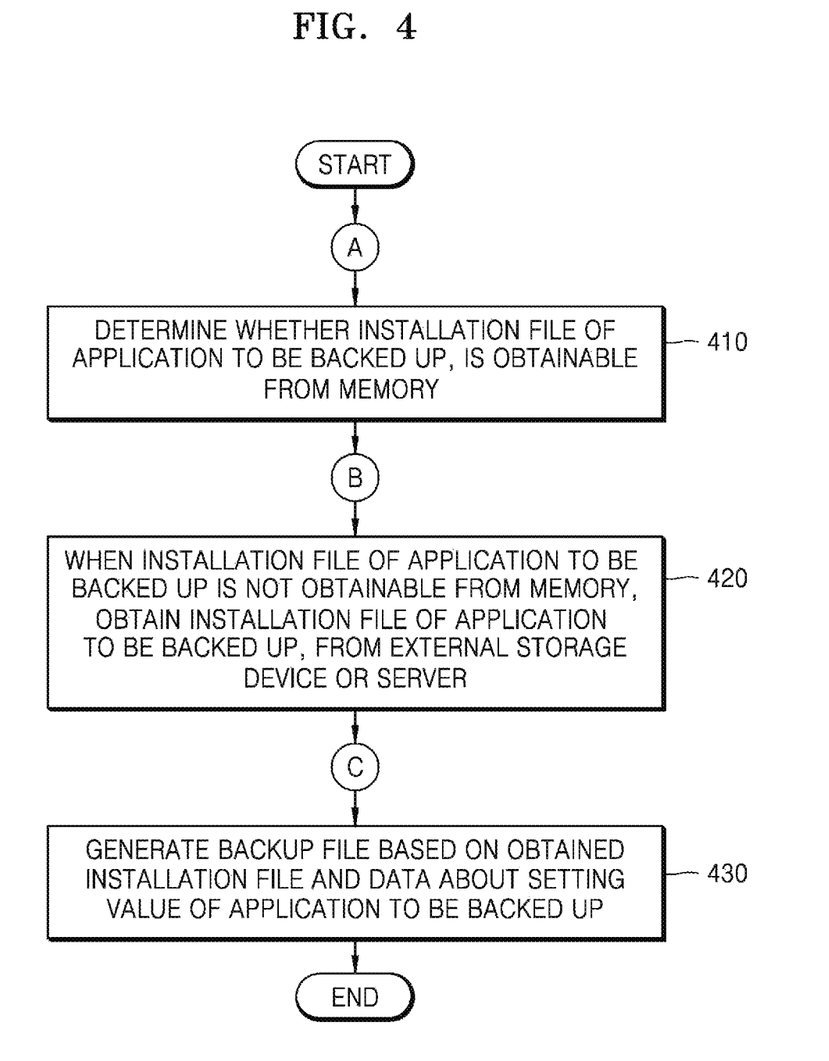
FIG. 4 is a flowchart of an operating method of an image forming apparatus according to an example.

FIG. 4 is a flowchart of an operating method of an image forming apparatus according to an example.

Operations of the method illustrated in FIG. 4 may be performed using the components of the image forming apparatus 100 illustrated in FIGS. 2 and 3. However, a description of the components provided above with reference to FIGS. 2 and 3 will be omitted for sake of brevity.

Referring to FIG. 4, the image forming apparatus 100 may determine whether an installation file of an application to be backed up is obtainable from the memory 140 of the image forming apparatus 100 in operation 410.

In an example, the image forming apparatus 100 may determine whether an installation file of an application to be backed up is present in the memory 140. When the installation file of the application to be backed up is not present in the memory 140, the image forming apparatus 100 may determine that an installation file of an application to be backed up is not obtainable from the memory 140.

When the installation file of the application to be backed up is present in the memory 140, the image forming apparatus 100 may determine whether the installation file of the application to be backed up is readable from the memory 140. When the installation file of the application to be backed up is not readable from the memory 140, the image forming apparatus 100 may determine that the installation file of the application to be backed up is not obtainable from the memory 140.

When the installation file of the application to be backed up is readable from the memory 140, the image forming apparatus 100 may determine whether the installation file of the application to be backed up is modified, whether the installation file of the application to be backed up is of a latest version, or the like.

Example operations related to operation 410 will be described later with reference to FIGS. 5A and 5B.

In operation 420, when the installation file of the application to be backed up is not obtainable from the memory 140 of the image forming apparatus 100, the image forming apparatus 100 may obtain the installation file of the application to be backed up from the external storage device 200 or the server 300.

In an example, the image forming apparatus 100 may determine whether the installation file of the application to be backed up is obtainable from the external storage device 200 or the server 300. When the installation file of the application to be backed up is obtainable from the external storage device 200 or the server 300, the image forming apparatus 100 may obtain the installation file of the application to be backed up, from the external storage device 200 or the server 300.

When the installation file of the application to be backed up is not obtainable from the external storage device 200 or the server 300, the image forming apparatus 100 may generate a backup file based on data about a setting value of the application to be backed up.

Example operations related to operation 420 will be described later with reference to FIG. 6.

In operation 430, the image forming apparatus 100 may generate a backup file based on the obtained installation file and data about a setting value of the application to be backed up.

Figure 5A:
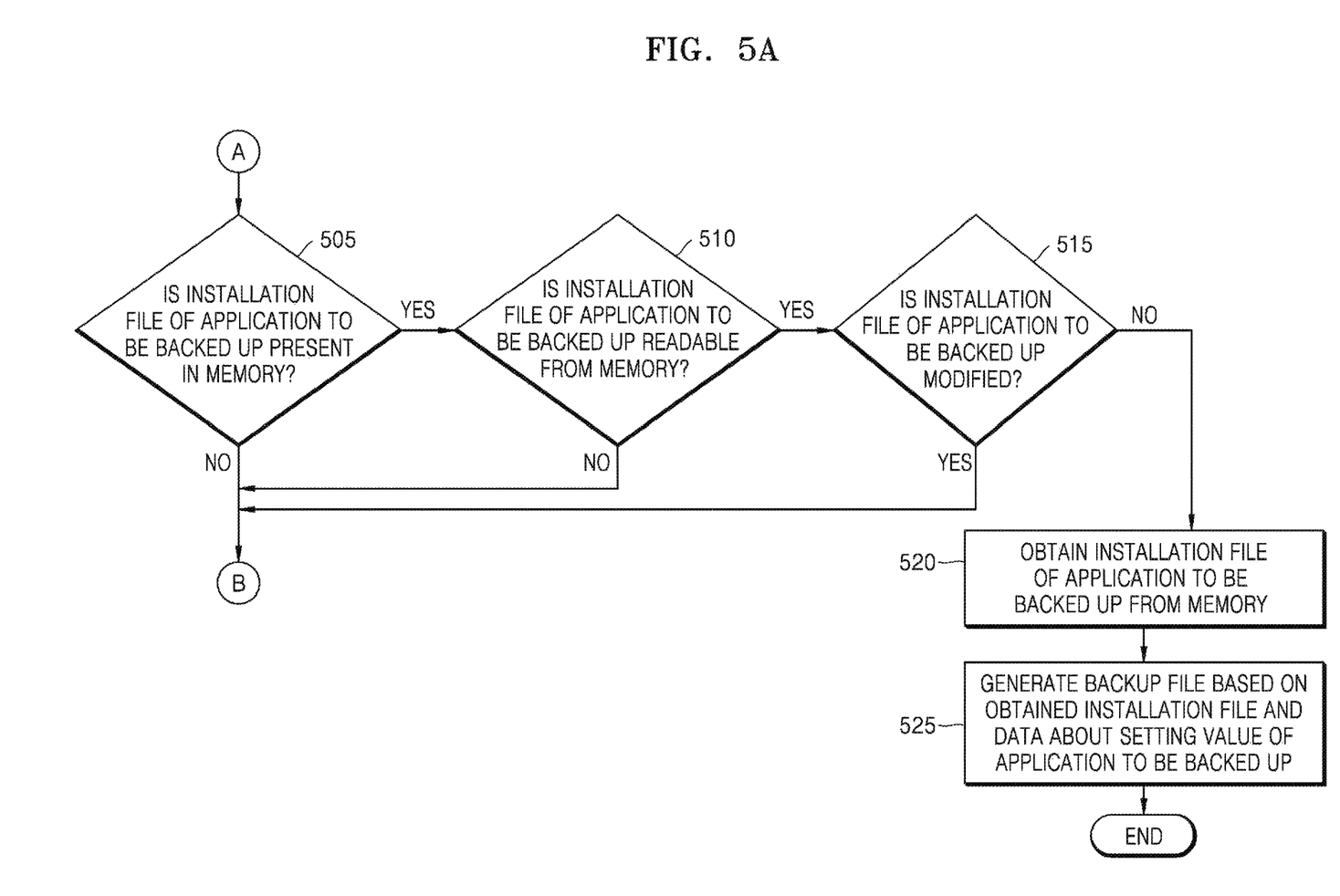
FIGS. 5A and 5B are flowcharts illustrating an operating method of an image forming apparatus based on whether an installation file of an application to be backed up is present in a memory according to an example.
Figure 5B:
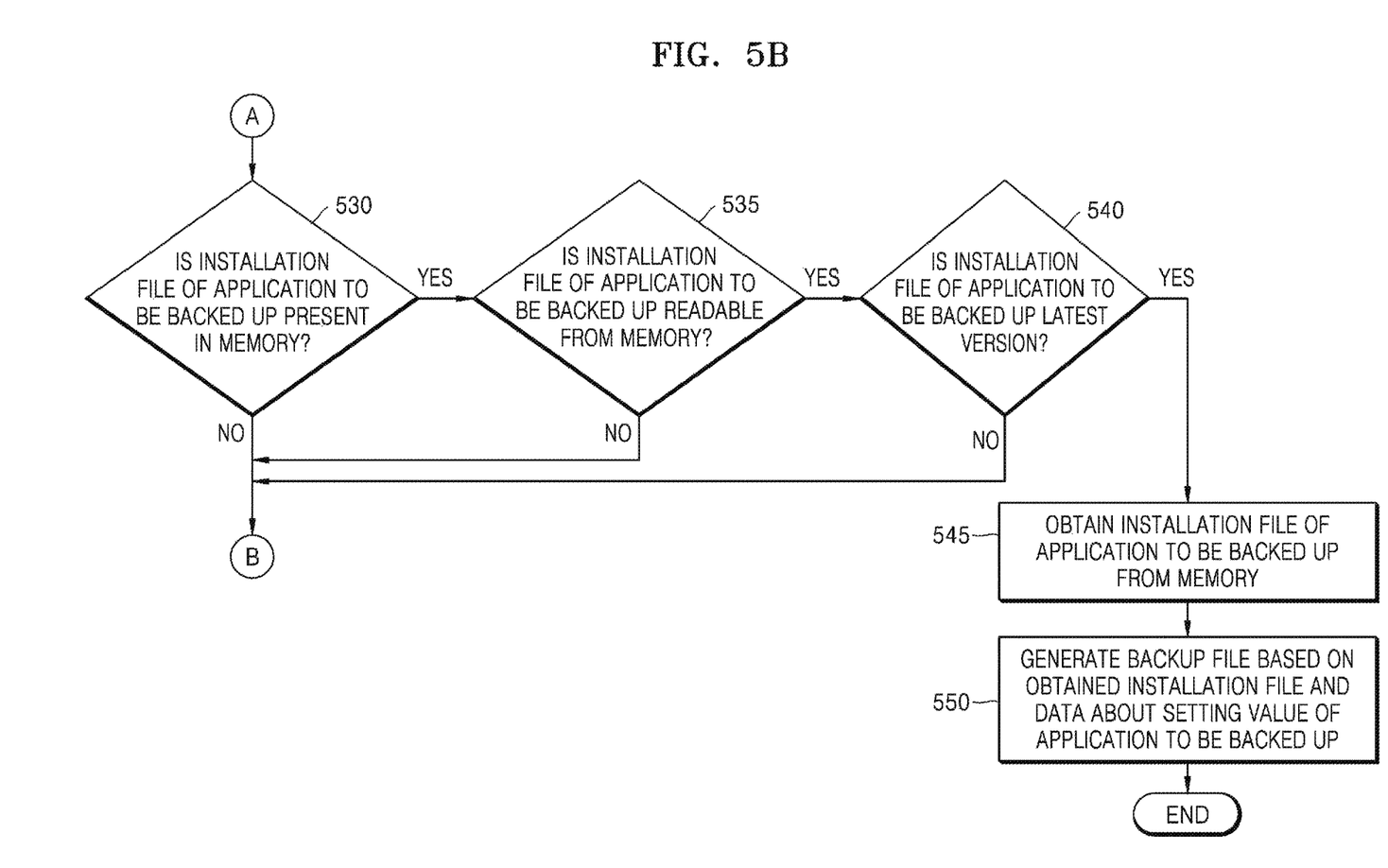

FIGS. 5A and 5B are flowcharts illustrating an operating method of an image forming apparatus based on whether an installation file of an application to be backed up is present in a memory according to an example.

FIG. 5A illustrates an example of an operating method of an image forming apparatus based on whether an installation file of an application to be backed up is present in a memory.

Referring to FIG. 5A, the image forming apparatus 100 may determine whether an installation file of an application to be backed up is present in the memory 140 in operation 505.

In an example, the image forming apparatus 100 may determine whether the installation file of the application to be backed up is present in the memory 140 based on information such as an ID of the application to be backed up, a package name, or the like. As an example, the processor 120 of the image forming apparatus 100 may determine whether the installation file of the application to be backed up is present in the memory 140 by searching the memory 140 for information such as an ID of the application to be backed up or a package name.

When the installation file of the application to be backed up is not present in the memory 140, the method may proceed to operation 420 of FIG. 4. When the installation file of the application to be backed up is present in the memory 140, the method may proceed to operation 510.

In operation 510, the image forming apparatus 100 may determine whether the installation file of the application to be backed up is readable from the memory 140.

In an example, the memory 140 may protect data stored in the memory 140 by selectively blocking data transmission or reception to or from at least one of the processor 120, the external storage device 200, or the server 300. When access to the memory 140 is blocked, the processor 120 of the image forming apparatus 100 may determine that the installation file of the application to be backed up is not readable from the memory 140.

In an example, when the installation file of the application to be backed up, present in the memory 140, is encoded and is not decodable, the processor 120 of the image forming apparatus 100 may determine that the installation file of the application to be backed up is not readable from the memory 140.

When the installation file of the application to be backed up is not readable from the memory 140, the method may proceed to operation 420 of FIG. 4. When the installation file of the application to be backed up is readable from the memory 140, the method may proceed to operation 515.

In operation 515, the image forming apparatus 100 may determine whether the installation file of the application to be backed up is modified.

When the installation file of the application to be backed up is present in the memory 140 and is damaged due to external hacking or a virus, or when the installation file of the application to be backed up is present in the memory 140 and is modified by a user's manipulation or the like, this may correspond to a modification of the installation file of the application to be backed up.

When a portion of data of an installation file of an application to be backed up, present in the memory 140, is modified as compared to an initial state thereof, the processor 120 of the image forming apparatus 100 may determine that the installation file of the application to be backed up is modified. In other words, the processor 120 of the image forming apparatus 100 may determine whether the installation file of the application to be backed up, present in the memory 140 is modified or not, based on an integrity determination of the installation file of the application to be backed up, present in the memory 140.

When a portion of data of the installation file of the application to be backed up, present in the memory 140, is modified, the image forming apparatus 100 may determine that integrity of the installation file is damaged. When the installation file of the application to be backed up, present in the memory 140, is identical to its initial state, the image forming apparatus 100 may determine that the integrity of the installation file is maintained.

In an example, as a result of an integrity determination, when an installation file of an application to be backed up, present in the memory 140, is modified, the method may proceed to operation 420. When an installation file of an application to be backed up is not modified, the method may proceed to operation 520.

In operation 520, the image forming apparatus 100 may obtain the installation file of the application to be backed up from the memory 140.

In an example, the processor 120 of the image forming apparatus 100 may obtain the installation file of the application to be backed up via the communication interface 130.

In operation 525, the image forming apparatus 100 may generate a backup file based on the obtained installation file and data about a setting value of the application to be backed up.

FIG. 5B illustrates an example of an operating method of an image forming apparatus based on whether an installation file of an application to be backed up is present in a memory.

In operations 530, 535, 545, and 550 of FIG. 5B, identical operations as those of operations 505, 510, 520, and 525 of FIG. 5A are respectively performed, and thus, a detailed description thereof will be omitted for brevity of description.

In operation 530, the image forming apparatus 100 may determine whether an installation file of an application to be backed up is present in the memory 140.

In operation 535, the image forming apparatus 100 may determine whether the installation file of the application to be backed up is readable from the memory 140.

In operation 540, the image forming apparatus 100 may determine whether the installation file of the application to be backed up is of a latest version.

In an example, the image forming apparatus 100 may compare an installation file of a latest version uploaded on the server 300 with a version of the installation file present in the memory 140 to determine whether the version of the installation file present in the memory 140 is a latest version.

In an example, operation 540 of determining whether the installation file of the application to be backed up is a latest version may be omitted according to a user's selection. For example, when the installation file of the application to be backed up is present in the memory 140, the user may use the user interface 110 to set the installation file of the application to be backed up to be obtained from the memory 140 regardless of a version of the installation file.

Alternatively, when a version of the installation file of the application to be backed up is within a preset range, the user may use the user interface 110 to set the processor 120 to obtain the installation file of the application to be backed up from the memory 140.

When the installation file of the application to be backed up is not a latest version, the method may proceed to operation 420 of FIG. 4, and when the installation file of the application to be backed up is a latest version, the method may proceed to operation 545.

In operation 545, the image forming apparatus 100 may obtain the installation file of the application to be backed up from the memory 140.

In operation 550, the image forming apparatus 100 may generate a backup file based on the obtained installation file and data about a setting value of the application to be backed up.

Figure 6:
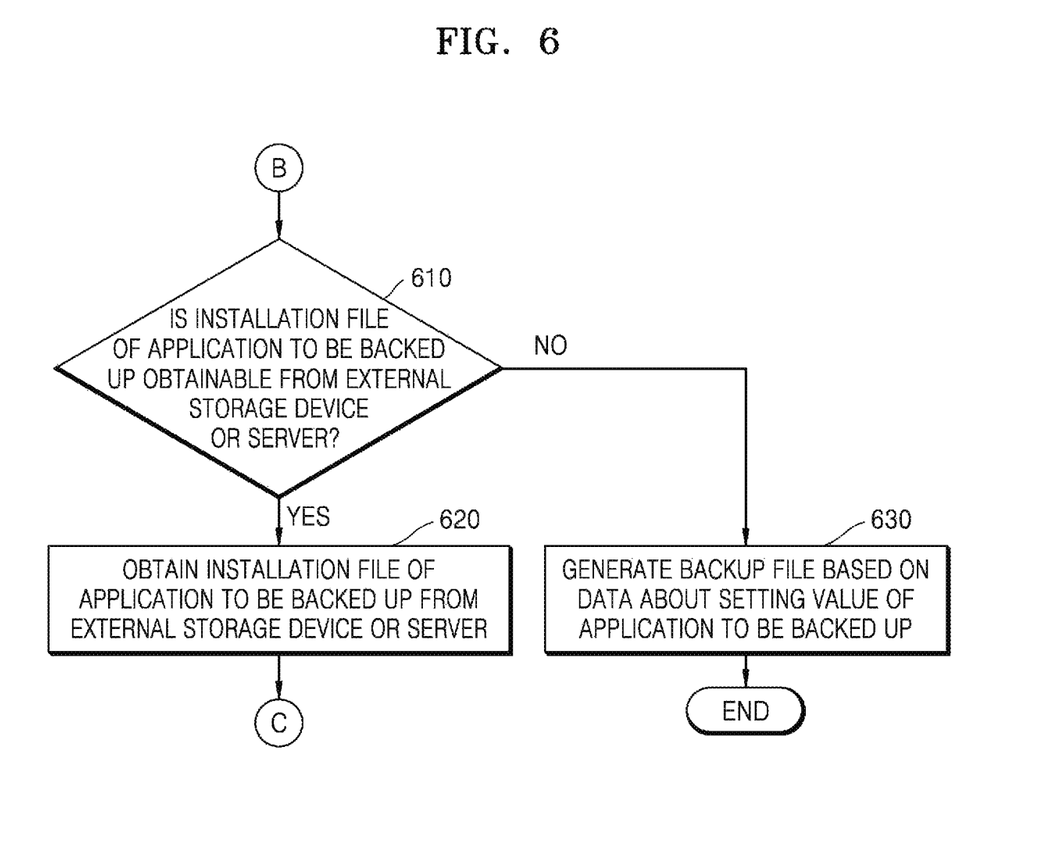
FIG. 6 is a flowchart of an operating method of an image forming apparatus based on whether an installation file of an application to be backed up is obtainable from an external storage device or a server according to an example.

FIG. 6 is a flowchart of an operating method of an image forming apparatus based on whether an installation file of an application to be backed up is obtainable from an external storage device or a server according to an example.

Referring to FIG. 6, the image forming apparatus 100 may determine whether an installation file of an application to be backed up is obtainable from the external storage device 200 or the server 300 in operation 610.

In an example, the external storage device 200, the server 300, or the image forming apparatus 100 may determine whether an installation file of an application to be backed up by the image forming apparatus 100 is obtainable from the external storage device 200 or the server 300, by determining whether the installation file of the application to be backed up is present in the external storage device 200 or the server 300, whether the installation file of the application to be backed up is readable from the external storage device 200 or the server 300, whether the installation file of the application to be backed up is modified, or whether the installation file of the application to be backed up is of a latest version.

For example, when an installation file stored in a USB connected to the image forming apparatus 100 is accessible only by a particular electronic device, when an installation file stored in a PC connected to the image forming apparatus 100 is encoded, or when access to a server is blocked due to server inspection, the image forming apparatus 100 may determine that an installation file of an application to be backed up is not obtainable from the external storage device 200 or the server 300.

Examples described in operation 610 may be different from the description with reference to FIGS. 4, 5A, and 5B, only in terms of the subject of the operations and substantially identical principles are applied. Thus, a detailed description thereof will be omitted for sake of brevity.

In an example, when an installation file of an application to be backed up by the image forming apparatus 100 is obtainable from the external storage device 200 or the server 300, the image forming apparatus 100 may request the external storage device 200 or the server 300 to transmit the installation file of the application to be backed up.

When the installation file of the application to be backed up is obtainable from the external storage device 200 or the server 300, the method may proceed to operation 620, and when the installation file of the application to be backed up is not obtainable from the external storage device 200 or the server 300, the method may proceed to operation 630.

In operation 620, the image forming apparatus 100 may obtain the installation file of the application to be backed up from the external storage device 200 or the server 300.

In an example, the processor 120 of the image forming apparatus 100 may obtain the installation file of the application to be backed up from the external storage device 200 or the server 300, via the communication interface 130.

In operation 630, the image forming apparatus 100 may generate a backup file based on data about a setting value of the application to be backed up.

In an example, when the image forming apparatus 100 has not obtained an installation file of an application to be backed up, and thus generated a backup file based only on data about a setting value of the application to be backed up, the image forming apparatus 100 may repeat operation 610 after a preset period, to obtain an installation file of an application to be backed up from the external storage device 200 or the server 300.

Figure 7:
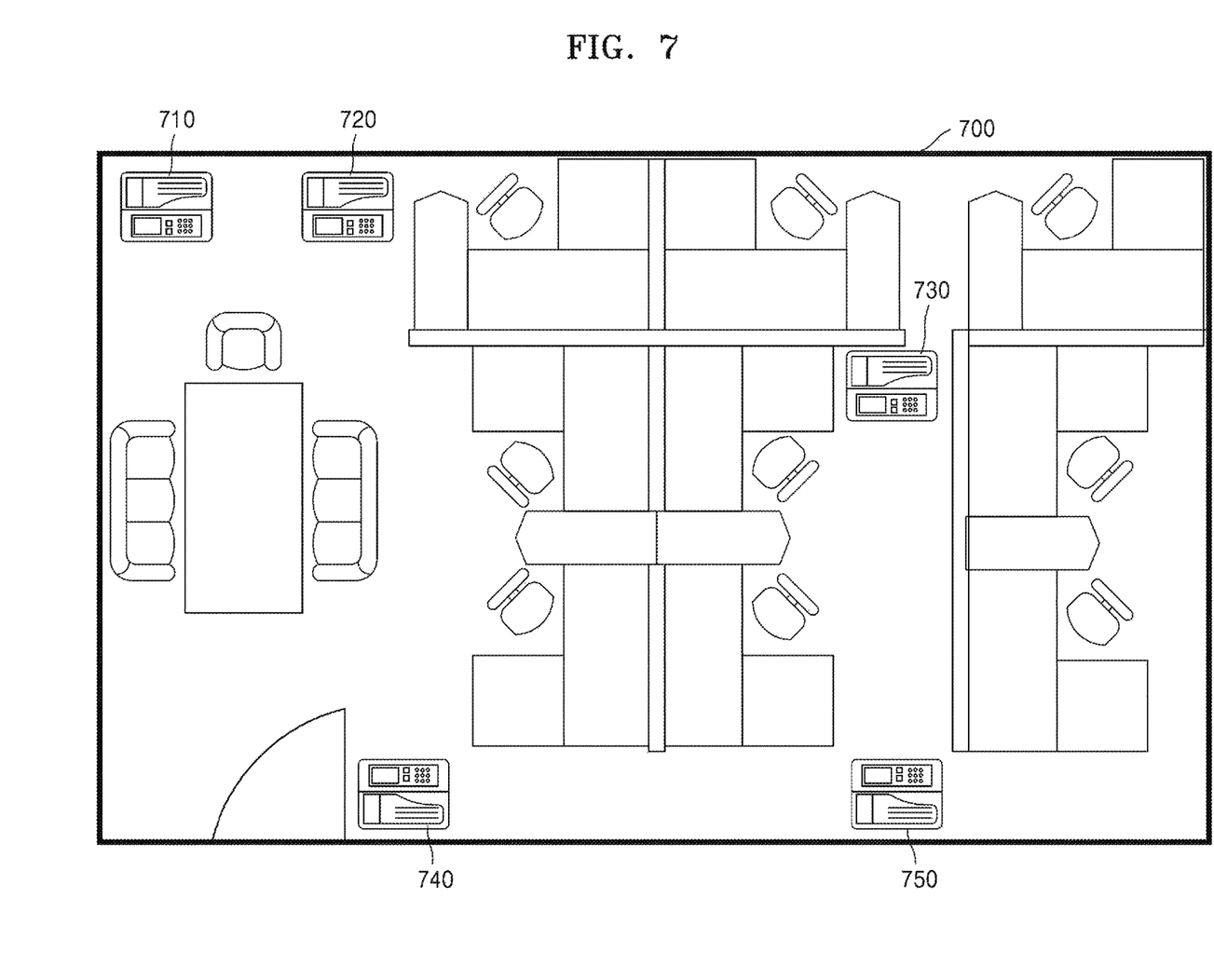
FIG. 7 is a view for describing obtaining, by an image forming apparatus, an installation file of an application to be backed up from an external storage device according to an example.

FIG. 7 is a view for describing obtaining, by an image forming apparatus, an installation file of an application to be backed up from an external storage device according to an example.

Referring to FIG. 7, electronic devices 710, 720, 730, 740, and 750 illustrated in space 700 of FIG. 7 may be referred to as an image forming apparatus, an external storage device, an external device, or the like according to circumstances.

As described above, when an installation file of an application to be backed up is not obtainable from the memory 140 of the image forming apparatus 100, the image forming apparatus 100 may obtain the installation file of the application to be backed up from the external storage device 200 or the server 300.

In an example, the image forming apparatus 100 may obtain an installation file of an application to be backed up from the external storage device 200 that is at a closest position to the image forming apparatus 100. For example, the image forming apparatus 100 may obtain an installation file of an application to be backed up from a PC that includes the installation file of the application to be backed up and that is at a closest position to the image forming apparatus 100.

In an example, the image forming apparatus 100 may obtain an installation file of an application to be backed up from an external image forming apparatus that is at a closest position to the image forming apparatus 100. For example, an image forming apparatus 710 may obtain an installation file of an application to be backed up from an external image forming apparatus 720 that includes the installation file of the application to be backed up and that is at a closest position to the image forming apparatus 710.

In an example, the image forming apparatus 100 may obtain an installation file of an application to be backed up from an external storage device that is closest thereto, from among external storage devices that are used by the same user as the user of the image forming apparatus 100. For example, when a user of the image forming apparatus 710 is also a user of the external storage device 740 and the external storage device 750, the image forming apparatus 710 may obtain an installation file of an application to be backed up from the external storage device 740 that includes the installation file of the application to be backed up and is closest to the image forming apparatus 710 from among external storage devices used by the same user as the user of the image forming apparatus 710.

Figure 8:
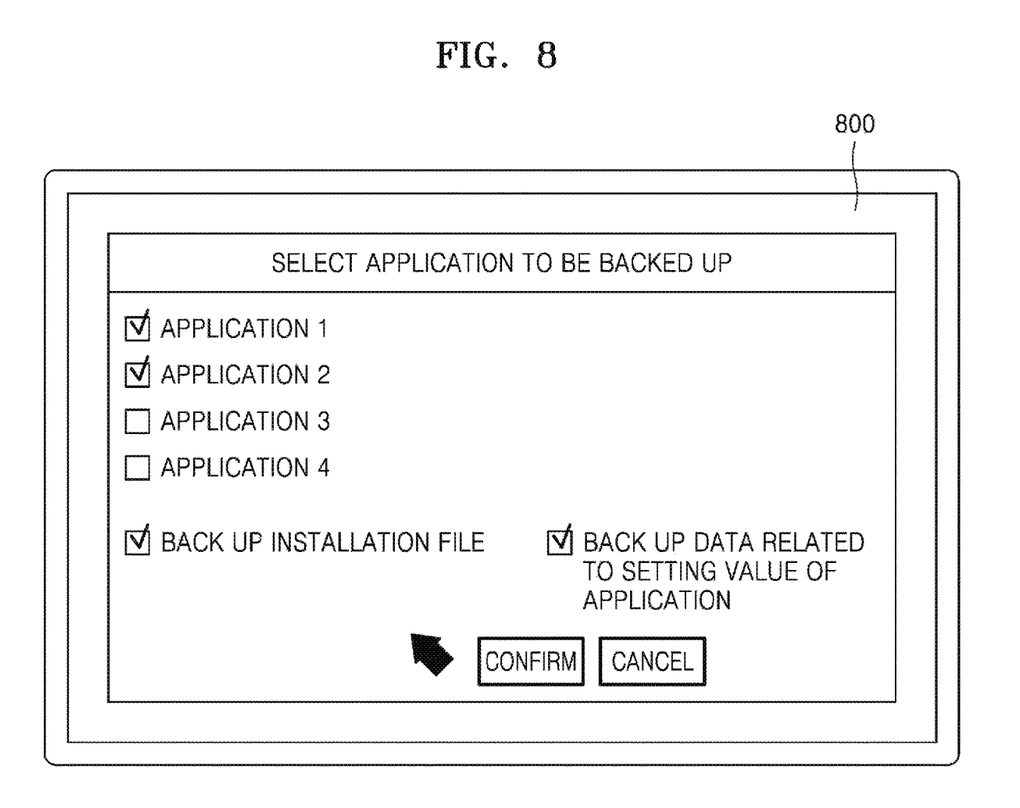
FIG. 8 illustrates a user interface for selecting an application to be backed up by an image forming apparatus according to an example.

FIG. 8 illustrates a user interface for selecting an application to be backed up by an image forming apparatus according to an example.

Referring to FIG. 8, the image forming apparatus 100 may display a screen 800 such that a user may select an application to be backed up. In an example, the user interface 110 may obtain a list of applications installed in the image forming apparatus 100 from the list processing unit 122 of the processor 120. The user interface 110 may display the list of applications installed in the image forming apparatus 100, obtained from the processor 120, and allow a user to select an application to be backed up.

When the image forming apparatus 100 performs backup, as illustrated in FIG. 8, the user interface 110 may receive, from a user, a selection regarding whether to back up an installation file of an application, whether to back up data related to a setting value of an application, or the like.

In an example, the user may input a control command (e.g., touching, mouse click, utterance, hovering, or the like) by referring to a screen 800 displayed on the user interface 110. Examples of a method used by the user interface 110 to transmit information to a user and a method used by a user to input a control command to the user interface 110 are not limited thereto.

Figure 9:
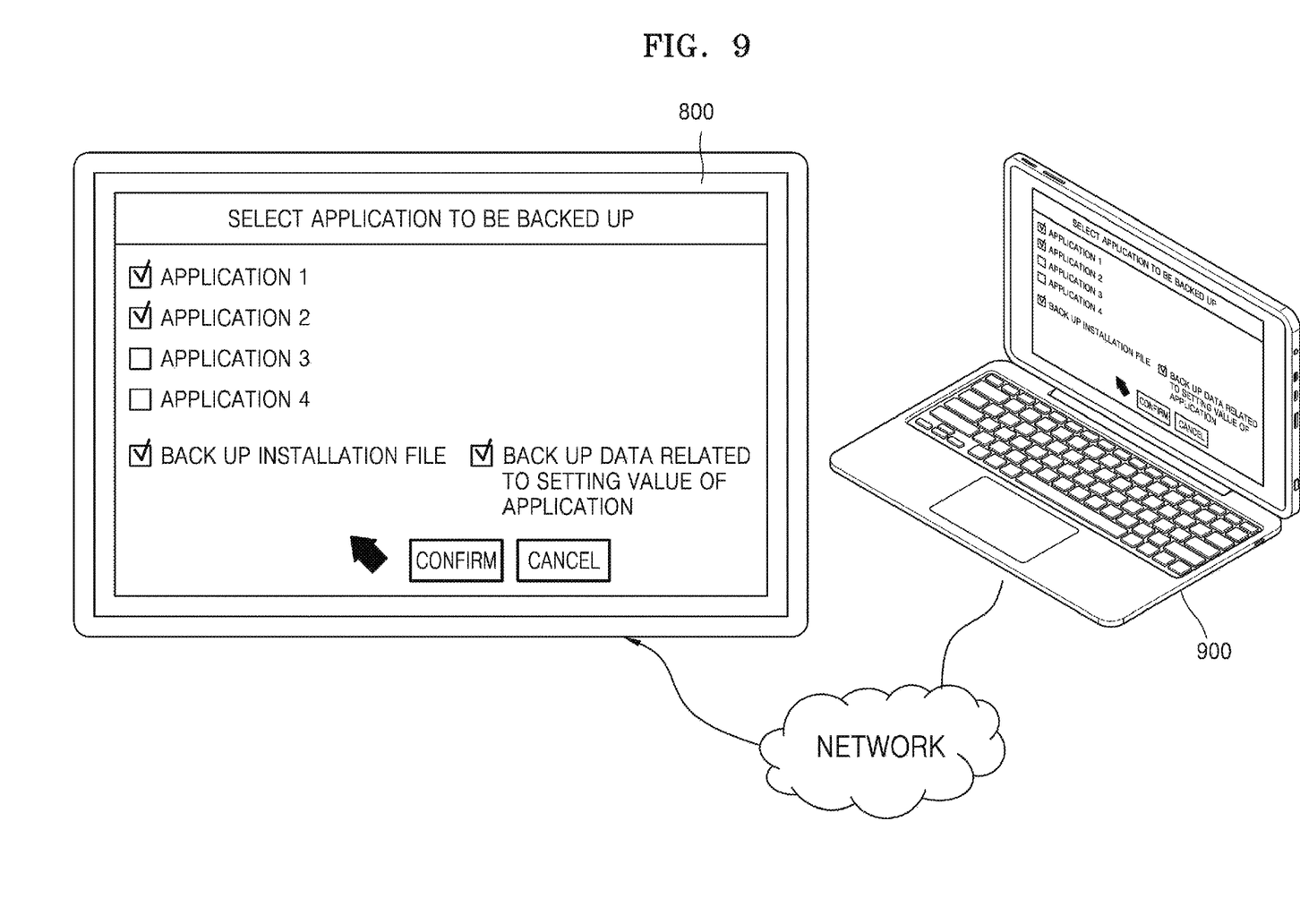
FIG. 9 illustrates an operation of selecting an application to be backed up by an image forming apparatus based on an input from an external device according to an example.

FIG. 9 illustrates an operation of selecting an application to be backed up by an image forming apparatus based on an input from an external device according to an example.

Referring to FIG. 9, the image forming apparatus 100 may obtain a backup execution command from an external device 900. In an example, the processor 120 of the image forming apparatus 100 may obtain a backup execution command from the external device 900 via the communication interface 130.

For example, a user of the external device 900 may control the external device 900 to provide a command to the image forming apparatus 100 to perform backup by remotely controlling at least one of the user interface 110 or the processor 120 of the image forming apparatus 100. While remotely controlling the image forming apparatus 100, a screen of the external device 900 may display an identical screen to the screen 800 of the user interface 110 of the image forming apparatus 100, and the user may transmit a backup command to the image forming apparatus 100 by referring to only the screen of the external device 900.

In an example, the image forming apparatus 100 may obtain an input for selecting an application to be backed up from the external device 900. For example, the processor 120 of the image forming apparatus 100 may obtain an input for selecting an application to be backed up from the external device 900 via the communication interface 130.

A user of the external device 900 may control the external device 900 to provide a command to the image forming apparatus 100 to select an application to be backed up, by remotely controlling at least one of the user interface 110 or the processor 120 of the image forming apparatus 100.

In an example, the image forming apparatus 100 may include an embedded web server providing a web service, and the image forming apparatus 100 may remotely control the external device 900 via interaction between the embedded web server of the image forming apparatus 100 and a remote control application of the external device 900. A remote control application of the external device 900 may be operated based on a web browser, but is not limited thereto.

A process after selecting an application to be backed up based on an input from the external device 900 is identical to the description provided with reference to FIGS. 1 through 8, and thus a description thereof will be omitted for sake of brevity.

While the disclosure has been shown and described with reference to examples thereof, it will be understood by those of ordinary skill in the art that various changes in form and details may be made therein without departing from the spirit and scope of the disclosure as defined by the appended claims. The examples should be considered in a descriptive sense only and not for purposes of limitation. For example, each element described as a single type may be distributed, and similarly, elements described to be distributed may be combined.

The scope of the disclosure is defined not by the detailed description of the disclosure but by the appended claims, and all differences within the scope will be construed as being included in the disclosure.

What is claimed is:

1. An image forming apparatus for backing up an application, the image forming apparatus comprising:
   a memory;
   a communication interface; and
   at least one processor,
   wherein the at least one processor:
      determines whether an installation file of an application to be backed up is present in the memory,
      determines, when the installation file of the application to be backed up is present in the memory, whether the installation file present in the memory is readable from the memory,
      obtains, when the installation file of the application to be backed up is not present in the memory or readable from the memory, the installation file of the application to be backed up from an external storage device or a server via the communication interface and stores the installation file obtained from the external storage device or the server in the memory, and
      generates a backup file based on data about a setting value of the application to be backed up and on the obtained installation file and transmits the backup file to the memory, the backup file to be used to restore the application.

2. The image forming apparatus of claim 1, wherein the at least one processor:
   determines, when the installation file present in the memory is readable from the memory, whether the installation file present in the memory is modified, and
   in response to the determination that the installation file present in the memory is modified, obtains the installation file of the application to be backed up from the external storage device or the server via the communication interface.

3. The image forming apparatus of claim 2, wherein the at least one processor determines whether the installation file present in the memory is modified based on a determination of an integrity of the installation file present in the memory.

4. The image forming apparatus of claim 1, wherein the at least one processor:
   determines whether the installation file present in the memory is a latest version when the installation file present in the memory is readable from the memory, and
   in response to the determination that the installation file present in the memory is not the latest version, obtains the installation file of the application to be backed up from the external storage device or the server via the communication interface.

5. The image forming apparatus of claim 1, wherein, when access to the memory is blocked, the at least one processor determines that an installation file of the application to be backed up is not readable from the memory.

6. The image forming apparatus of claim 1, further comprising a user interface via which a user input is obtained,
   wherein the at least one processor determines the application to be backed up based on the user input obtained via the user interface.

7. The image forming apparatus of claim 1, wherein the at least one processor:
   obtains a user input of an external device via the communication interface, and
   determines the application to be backed up based on the obtained user input of the external device.

8. The image forming apparatus of claim 1, wherein, when the installation file of the application to be backed up is not present in the memory, the at least one processor obtains the installation file of the application to be backed up, via the communication interface, from an external storage device that includes the installation file of the application to be backed up and is at a closest position to the image forming apparatus.

9. An operating method of an image forming apparatus for backing up an application, the operating method comprising:
   determining whether an installation file of an application to be backed up is present in a memory of the image forming apparatus;
   when the installation file of the application to be backed up is present in the memory, determining whether the installation file present in the memory is readable from the memory;
   obtaining, when the installation file of the application to be backed up is not present in the memory or readable from the memory, the installation file of the application to be backed up from an external storage device or a server and storing the installation file obtained from the external storage device or the server in the memory; and
   generating a backup file based on data about a setting value of the application to be backed up and on the obtained installation file and transmitting the backup file to the memory, the backup file to be used to restore the application.

10. The operating method of claim 9, further comprising:
    determining whether the installation file present in the memory is modified when the installation file present in the memory is readable from the memory; and
    in response to the determination that the installation file present in the memory is modified, obtaining the installation file of the application to be backed up from the external storage device or the server.

11. The operating method of claim 9, further comprising:
    determining whether the installation file present in the memory is a latest version when the installation file present in the memory is readable from the memory; and
    in response to the determination that the installation file present in the memory is not the latest version, obtaining the installation file of the application to be backed up from the external storage device or the server.

12. A non-transitory computer-readable recording medium having recorded therein a program for executing an operating method of an image forming apparatus for backing up an application, the non-transitory computer-readable recording medium comprising:

instructions to determine whether an installation file of an application to be backed up is present in a memory of the image forming apparatus;

instructions to determine, when the installation file of the application to be backed up is present in the memory, whether the installation file present in the memory is readable from the memory;

instructions to obtain, when the installation file of the application to be backed up is not present in the memory or readable from the memory, the installation file of the application to be backed up from an external storage device or a server and store the installation file obtained from the external storage device or the server in the memory; and     instructions to generate a backup file based on data about a setting value of the application to be backed up and on the obtained installation file and transmit the backup file to the memory, the backup file to be used to restore the application.

13. The non-transitory computer-readable recording medium of claim 12, further comprising instructions to:

determine, when the installation file present in the memory is readable from the memory, whether the installation file present in the memory is modified; and     in response to the determination that the installation file present in the memory is modified, obtain the installation file of the application to be backed up from the external storage device or the server via a communication interface.

14. The non-transitory computer-readable recording medium of claim 13, further comprising instructions to determine whether the installation file present in the memory is modified based on a determination of an integrity of the installation file present in the memory.

15. The non-transitory computer-readable recording medium of claim 12, further comprising instructions to:

determine whether the installation file present in the memory is a latest version when the installation file present in the memory is readable from the memory, and     in response to the determination that the installation file present in the memory is not the latest version, obtain the installation file of the application to be backed up from the external storage device or the server via a communication interface.

16. The non-transitory computer-readable recording medium of claim 12, further comprising instructions to, when access to the memory is blocked, determine that an installation file of the application to be backed up is not readable from the memory.

17. The non-transitory computer-readable recording medium of claim 12, further comprising instructions to determine the application to be backed up based on a user input obtained via a user interface.

18. The non-transitory computer-readable recording medium of claim 12, further comprising instructions to:

obtain a user input of an external device via a communication interface; and     determine the application to be backed up based on the obtained user input of the external device.

\* \* \* \* \*